United States Patent Office 3,699,081
Patented Oct. 17, 1972

3,699,081
METHOD FOR STABILIZING ACRYLAMIDE
Akira Iwashita, Tamio Tsunokawa, and Masahiro Yuyama, Niihama, Japan, assignors to Sumitomo Chemical Company, Ltd., Osaka, Japan
No Drawing. Filed Aug. 25, 1970, Ser. No. 66,864
Claims priority, application Japan, Aug. 30, 1969, 44/68,959
Int. Cl. C07c *103/00*
U.S. Cl. 260—561 N                10 Claims

ABSTRACT OF THE DISCLOSURE

Polymerization of acrylic amides is very effectively inhibited by adding thereto at least one nitrosobenzene derivative having one methyl group at the two ortho positions with regard to the nitroso group. Said nitrosobenzene derivatives are also excellent in that they have a very small coloring activity. Said derivatives exhibit the polymerization-inhibiting effect when they are added during the preparation of acrylic amides or during the storage of the acrylic amides. The amount of said derivatives added normally ranges from 0.00001 to 0.5% by weight based on the weight of acrylic amides, but the preferred amount varies within said range depending upon the environmental conditions of acrylic amides.

---

The present invention relates to a stabilized acrylic amide composition and a method for stabilizing acrylic amide.

Acrylamide and α-substituted acrylamides, for example, methacrylamide (these are generically called as acrylic amides hereinafter) are useful monomers having a wide utility, and they are generally prepared by reacting nitrites with water and sulfuric acid. That is to say, acrylonitrile or an α-substituted acrylonitrile, for example, methacrylonitrile, is hydrolyzed with water and sulfuric acid to an acrylic amide sulfate. The acrylic amide sulfate is neutralized with an alkali or ammonia in the presence of water, an organic solvent, such as an alcohol or the like or a mixture thereof to give an acrylic amide solution. The acrylic amide solution is then concentrated or cooled and acrylic amide crystals are obtained.

In the course of preparation of the acrylic amides, therefore, there are included steps wherein acrylic amides are treated in solution or in slurry, such as neutralization, concentration, cooling, separation and the like, and steps wherein the acrylic amides are treated at relatively high temperatures, such as neutralization, concentration, drying and the like, and thus, the acrylic amides are places under such circumstances that polymerization thereof can easily be caused.

In the above operations, therefore, large amounts of polymers are formed to lower not only the purity and the quality of the acrylic amides, but also the yield of the acrylic amides, and the gelled products adhere to the interior of the production apparatus to disturb the flow of liquid inside the tubes, whereby said operations themselves are made impossible. It is necessary to take steps to inhibit the polymerization even when the acrylic amides are stored for an extended period of time, or otherwise, the polymerization proceeds progressively to extremely deteriorate the quality.

To lower the operation temperature throughout the course of the preparation and storage of the acrylic amides is one of the methods for inhibiting the polymerization, however the practical operation temperature conditions are not effective in the stabilization of the acrylic amide.

Another method is that oxygen in air is made present in the acrylic amides, but it is insufficient for the inhibition of the polymerization of the acrylic amides.

Various compounds have, therefore, been proposed as the polymerization inhibitors for the acrylic amides. However, the previously known compounds have any of such disadvantages that they are low in polymerization inhibiting ability and therefore, in order to expect an effective polymerization inhibition, they are required to be used in considerably large amounts. Even when the polymerization-inhibiting ability of the compound is relatively high, the compound colors the acrylic amide crystals or no polymerization inhibiting effect on an aqueous solution of the acrylic amides due to the insolubility of the compound in the aqueous solution. It is quite rare that these compounds have an effective polymerization-inhibiting action on any forms of the acrylic amides.

Previously known polymerization-inhibitors, for example, ferrous salts, cupric salts, hydroquinone, benzoquinone and the like have a small effect if added in a small amount, and they color the acrylic amides if added in a large amount, whereby the use of the acrylic amides in homopolymerization, co-polymerization and the like is greatly disturbed. Cupferron, cupferron iron salt, nitroso-R salt, nitrosoresorcinol monomethyl ether and the like have also a very high coloring ability which constitutes a great disturbance.

As a result of extensive research on the polymerization-inhibiting effect on the acrylic amides of the various compounds and the coloring ability thereof, the present inventors have surprisingly found that certain aromatic nitroso compounds have a strong polymerization-inhibiting action but have substantially no coloring ability.

An object of the present invention is to provide a stabilized acrylic amide composition.

Another object of the present invention is to provide an acrylic amide stabilized with aromatic nitroso compounds.

A further object of the present invention is to provide an acrylic amide which has substantially no color and is inhibited from being polymerized.

A further object of the present invention is to provide a process for the preparation of a stabilized acrylic amide composition.

Other objects and advantages of the present invention will become apparent from the following description.

The present inventors have found that among the nitrosobenzene derivatives, those having one methyl group at the two ortho positions with regard to the nitroso group effectively inhibit the polymerization of the acrylic amide and have a very low coloring ability.

Examples of the nitrosobenzene derivatives which may be used in accordance with the present invention include 2,6 - dimethylnitrosobenzene, 2,4,6 - trimethylnitrosobenzene, 2,6-dimethyl-4-tert-butylnitrosobenzene, 2,6-dimethyl-4-carboxynitrosobenzene and the like.

They effectively display their ability of inhibiting the polymerization of acrylic amide in every mode of from neutralization step in the preparation to storage thereof and have a very low coloring ability.

Though they are sparingly soluble in water, they are soluble in an aqueous solution of acrylic amide and effectively display their ability of inhibiting the polymerization on the aqueous solution. These polymerization inhibitors, therefore, completely inhibit the polymerization of acrylic amide, under such severe treating conditions as encountered in the neutralization, concentration or drying step in which acrylic amide in treated in the form of an aqueous solution, organic solvent solution, slurry or crystals and do not completely color acrylic amide.

Further, they are usable also in storing acrylic amide in the form of crystals or of aqueous or organic solvent solution, whereby the polymerization of acrylic amide is inhibited to make possible the storage thereof for a long period of time and they do not become a cause for coloration which forms an obstacle in a variety of usages.

The amount of these polymerization inhibitors to be added is generally within the range from 0.00001 to 0.5% by weight based on the weight of the acrylic amide. Of course, the preferred amount varies depending on the environmental conditions of the acrylic amides. For example, for the polymerization inhibition of acrylic amide crystals, the amount of inhibitor is selected from the range of 0.00001 to 0.004% by weight so as to be suitable for a required polymerization inhibition period. On the other hand, under severe conditions adopted for the process liquid during the preparation, the amount is preferably in the range of 0.01 to 0.057 by weight. The polymerization inhibitors in accordance with the present invention may be used either independently or in admixture.

The particular characteristic of the present invention is that the polymerization of the acrylic amide is completely inhibited by the addition of a slight amount of the compounds and that only a slight coloration is caused with the lapse of time, and hence, the stabilized acrylic amides can be used in various fields without any obstacles, and there is no meaning that the present inhibitor is used in combination with other inhibitors proposed heretofore.

The o,o'-dimethyl-substituted derivative of nitrosobenzene of the present invention can be employed repeatedly in the preparation because of very low degree of coloration and of deterioration with lapse of time. On the other hand, nitrosobenzene, and nitrosobenzene derivatives having no methyl groups at the two ortho position, for example, 2-methoxy-, 2-hydroxy-, 2-cyano-, 2-halogeno-, 2-amino-, 2-nitro-nitrosobenzenes and the like are insufficient for the present purpose because of very high degree of coloration and of deterioration with lapse of time. That is to say, among the nitrosobenzene derivatives, only those having one methyl group at the two ortho positions with regard to the nitroso group are suited to the object of the present invention.

It is not clear why the coloring ability of the compounds obtained by replacement of two hydrogen atoms at the ortho positions of nitrosobenzene with two methyl groups is markedly reduced. However, it may be that the reduction of the coloring ability has a relation with an increased ratio of the presence of a nitroso compound as a dimer because the resonance between the nitroso group and the phenyl group is hindered due to the steric hindrance produced by the methyl groups introduced.

The present invention is explained in more detail by referring to examples, which are by way of illustration and not by way of limitation.

EXAMPLE 1

A variety of polymerization inhibitors were added in an amount of 100 p.p.m. to an aqueous solution containing 55% by weight of acrylamide, 5.5% by weight of ammonium sulfate and 5 p.p.m. of iron and the time until the commencement of polymerization was measured at 60° C. under an atmosphere of nitrogen and the following results were obtained.

| Run number | Polymerization inhibitors | Time until commencement of polymerization (min.) | Degree of coloration after 6 hours [1] |
|---|---|---|---|
| Reference example: | | | |
| 1-1 | Control (no addition) | 8 | |
| 1-2 | Hydroquinone | 11 | |
| 1-3 | Ferrous sulfate | 60 | |
| 1-4 | Sodium nitrite | 9 | |
| 1-5 | Nitrosobenzene | <360 | 30-40 |
| Example: | | | |
| 1-1 | 2,6-dimethylnitrosobenzene | <360 | >10 |
| 1-2 | 2,4,6-trimethylnitrosobenzene | <360 | >10 |
| 1-3 | 2,6-dimethyl-4-ethylnitrosobenzene | <360 | >10 |
| 1-4 | 2,6-dimethyl-4-carboxynitrosobenzene | <360 | >10 |
| 1-5 | 2,6-dimethyl-4-tert.butylnitrosobenzene | <360 | >10 |

[1] The degree of coloration was a value corresponding to the APHA value.

EXAMPLE 2

The relation between the amount of polymerization inhibitors to be added and the time until the commencement of polymerization was studied in the same conditions as in Example 1 and the following results were obtained.

| Run number | Polymerization inhibitors | Amount added (p.p.m.) | Time before commencement of the polymerization (min.) |
|---|---|---|---|
| Reference example: | | | |
| 2-1 | Control (no addition) | | 8 |
| Example: | | | |
| 2-1 | 2,6-dimethylnitrosobenzene | 1 | 190 |
| | | 3 | 290 |
| | | 10 | <360 |
| 2-2 | 2,4,6-trimethylnitrosobenzene | 1 | 195 |
| | | 3 | 300 |
| | | 10 | <360 |
| 2-3 | 2,4-dimethyl-4-tert.butyl-nitrosobenzene | 1 | 193 |
| | | 3 | 295 |
| | | 10 | <300 |

EXAMPLE 3

Polymerization inhibitors were added in an amount of 400 p.p.m. to an aqueous solution containing 40% by weight of acrylamide, 10% by weight of ammonium sulfate and 5 p.p.m. of iron, respectively, and the degree of coloration and deterioration with lapse of time were examined at 30° C. in the air and the following results were obtained.

The degree of coloration was expressed by APHA corresponding values, but when the color tone was somewhat different, the value having the identical brightness was employed.

| Run number | Polymerization inhibitors | Degree of coloration | | |
|---|---|---|---|---|
| | | Immediately after addition | After 3 days | After 7 days |
| Reference example: | | | | |
| 3-1 | Cupferron | 50-70 | 200-250 | <500 |
| 3-2 | Cupferron iron salt | <500 | <500 | <500 |
| 3-3 | Nitrosoresorcinol monomethyl ether | <500 | <500 | <500 |
| 3-4 | Nitrosobenzene | 100-150 | 300-350 | <500 |
| 3-5 | 4-methyl-nitrosobenzene | 70-100 | 250-300 | <500 |
| Example: | | | | |
| 3-1 | 2,6-dimethyl-nitrosobenzene | 20-30 | 30-40 | 40-50 |
| 3-2 | 2,4,6-trimethyl-nitrosobenzene | 20-30 | 20-30 | 30-40 |
| 3-3 | 2,6-dimethyl-4-tert.butyl-nitrosobenzene | 20-30 | 30-40 | 40-50 |
| 3-4 | 2,6-dimethyl-4-carboxy-nitrosobenzene | 20-30 | 20-30 | 30-4 |

EXAMPLE 4

100 g. of acrylamide sulfate obtained by hydrolysis of acrylonitrile with water and sulfuric acid were dissolved in 50 g. of water and a variety of polymerization inhibitors were each added thereto in a proportion of 10 p.p.m., and the pH was adjusted to 7.0 with gaseous ammonia. After neutralization, the formed ammonium sulfate was separated and the thus obtained aqueous solution of acrylamide was concentrated at 30° C. under a reduced pressure to precipitate the acrylamide crystal. The concentration was discontinued at the slurry concentration of the crystal of 50% and the crystals were separated by centrifugation, dried at 40° C. under the pressure of 10 mm. Hg to yield the product of acrylamide.

The relation between the quality of acrylamide obtained under these operational conditions and the polymerization inhibitors added were shown hereinbelow.

| | | Quality of the products | |
|---|---|---|---|
| | Polymerization inhibitors | Aqueous solution [1] | Degree of coloration |
| Reference example: | | | |
| 4-1 | Control (no addition) | White turbid | ([2]) |
| 4-2 | Cupferron iron salt | Clean | 40 |
| 4-3 | Sodium nitrite | White turbid | ([2]) |
| Example: | | | |
| 4-1 | 2,6-dimethylnitrosobenzene | Clean | >10 |
| 4-2 | 2,4,6-trimethylnitrosobenzene | do | >10 |
| 4-3 | 2,6-dimethyl-4-tert.butyl-nitrosobenzene | do | >10 |
| 4-4 | 2,6-dimethyl-4-carboxy-nitrosobenzene | do | >10 |

[1] The aqueous solution represents an aqueous solution obtained by dissolving 50 g. of the product acrylamide in 50 g. of water.
[2] →Unmeasurable.

EXAMPLE 5

Each of polymerization inhibitors was added in an amount of 5 p.p.m., respectively, (i.e. the total amount added, 10 p.p.m.) under the same conditions as in Example 4.

The following results were obtained.

| | | Quality of the product | |
|---|---|---|---|
| | Polymerization inhibitors | Aqueous solution | Degree of coloration |
| Reference example: | | | |
| 5-1 | Control (no addition) | White turbid | ([1]) |
| Example: | | | |
| 5-1 | 2,6-dimethylnitrosobenzene / 2,4,6-trimethylnitrosobenzene | Clean | >10 |
| 5-2 | 2,4,6-trimethylnitrosobenzene / 2,6-dimethyl-4-carboxynitrosobenzene | do | >10 |
| 5-3 | 2,6-dimethylnitrosobenzene / 2,6-dimethyl-4-tert.butylnitrosobenzene | do | >10 |
| 5-4 | 2,6-dimethyl-4-tert.butylnitrosobenzene / 2,6-dimethyl-4-carboxynitrosobenzene | do | >10 |

[1] Unmeasurable.

EXAMPLE 6

The polymerization inhibitors shown in the following table were each added in an amount of 100 p.p.m. to an aqueous solution containing 30% by weight of methacrylamide and 2% by weight of ammonium sulfate and the time until the commencement of polymerization was measured at 60° C. under an atmosphere of nitrogen and the following results were obtained.

| Polymerization inhibitors | Time until the commencement of polymerization (min.) |
|---|---|
| Reference example: | |
| 6-1 Control (no addition) | 20–25 |
| 6-2 Hydroquinone | 20–25 |
| Example: | |
| 6-1 2,6-dimethylnitrosobenzene | <200 |
| 6-2 2,4,6-trimethylnitrosobenzene | >200 |
| 6-3 2,6-dimethyl-4-tert.butylnitrosobenzene | >200 |
| 6-4 2,6-dimethyl-4-carboxynitrosobenzene | <200 |

It was observed that even with the methacrylamide the polymerization inhibitors of the present invention inhibit the polymerization effectively and do not color the polymers as well.

What we claim is:

1. A stabilized acrylic amide composition which comprises an acrylic amide and at least one nitrosobenzene derivative selected from the group consisting of 2,6-dimethylnitrosobenzene, 2,4,6-trimethylnitrosobenzene, 2,6-dimethyl-4-tert.butylnitrosobenzene and 2,6-dimethyl-4-carboxynitrosobenzene.

2. A composition according to claim 1 wherein the acrylic amide is in solution.

3. A composition according to claim 1 wherein the amount of the nitrosobenzene derivative is from 0.00001 to 0.5% by weight based upon the weight of the acrylic amide.

4. A composition according to claim 1, wherein the acrylic amide is crystalline.

5. A composition according to claim 4, wherein the amount of the nitrosobenzene derivative is from 0.00001 to 0.004% by weight.

6. A composition according to claim 1, wherein the acrylic amide is either acrylamide or methacrylamide.

7. A composition according to claim 2, wherein the acrylic amide solution is an aqueous solution.

8. A composition according to claim 2, wherein the acrylic amide solution is an organic solvent solution.

9. A process for the preparation of a stabilized acrylic amide composition which comprises hydrolyzing acrylonitrile or α-substituted acrylonitrile with water and sulfuric acid to form an acrylic amide sulfate, neutralizing the same in the presence of at least one nitrosobenzene derivative selected from the group consisting of 2,6-dimethylnitrosobenzene, 2,4,6-trimethylnitrosobenzene, 2,6-dimethyl-4-tert.butylnitrosobenzene and 2,6-dimethyl-4-carboxynitrosobenzene with an alkali or ammonia in the presence of water or an organic solvent and separating the formed sulfate salt.

10. A process according to claim 9, wherein the amount of the nitrosobenzene derivative is from 0.01 to 0.05% by weight based upon the weight of acrylonitrile or α-substituted acrylonitrile.

References Cited

UNITED STATES PATENTS 3,397,232   8/1968   Ta Kagi et al. _____ 260—561 N

LEWIS GOTTS, Primary Examiner

E. G. LOVE, Assistant Examiner